United States Patent [19]

Murayama et al.

[11] Patent Number: 4,924,965
[45] Date of Patent: May 15, 1990

[54] SPEAKER SYSTEM

[75] Inventors: Fumio Murayama, Tendou; Takashi Suzuki, Tendo, both of Japan

[73] Assignee: Pioneer Electronic Corporation, Tokyo, Japan

[21] Appl. No.: 349,678

[22] Filed: May 10, 1989

[30] Foreign Application Priority Data

Oct. 12, 1988 [JP] Japan ............................ 63-132295[U]

[51] Int. Cl.⁵ .............................................. H05K 5/00
[52] U.S. Cl. .................................... 181/156; 181/141; 181/144; 181/148; 181/150; 181/153; 181/199; 381/86
[58] Field of Search ............... 181/141, 144, 146, 150, 181/153, 156, 148, 199; 381/86, 88

[56] References Cited

U.S. PATENT DOCUMENTS 2,808,121 10/1987 Goettner ............................ 181/145
3,892,288 7/1975 Klayman et al. ................... 181/156
4,549,631 10/1985 Bose ................................ 181/156 X

FOREIGN PATENT DOCUMENTS 1420714 1/1976 United Kingdom ................. 381/88

Primary Examiner—Benjamin R. Fuller
Attorney, Agent, or Firm—Sughrue, Mion, Zinn, MacPeak & Seas

[57] ABSTRACT

A speaker system mounted on a rear portion of a vehicle compartment. The speaker system has an elongated cabinet extending in horizontal direction, and an elongated buffle plate coupled to a front open end of the cabinet for providing a cabinet chamber. Within the chamber, a woofer speaker is provided. A vibration surface of the woofer speaker extends in a direction perpendicular to a longitudinal direction of the cabinet, and a speaker frame of the woofer speaker is interposedly supported between the cabinet and the buffle plate.

5 Claims, 2 Drawing Sheets

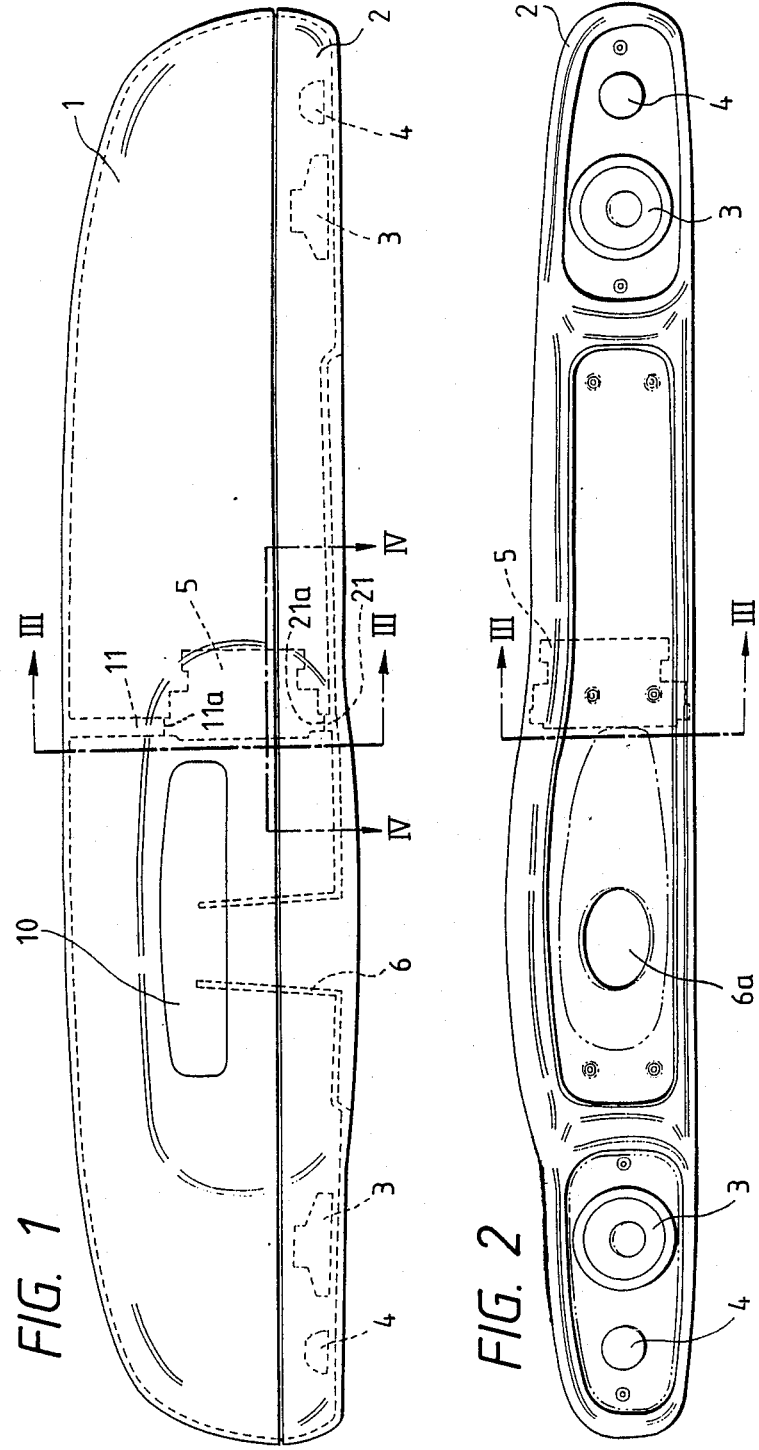

SPEAKER SYSTEM

BACKGROUND OF THE INVENTION

The present invention relates to a speaker system, and more particularly, to a speaker unit mounting structure in a stationary type speaker system installed in a rear portion of a vehicle compartment.

In a conventional speaker system, a baffle plate is provided at a front portion of a cabinet, and the baffle plate is formed with a bore for fixely securing a flange portion of a speaker unit such as a woofer speaker at or around the bore, to thereby attach the speaker unit to the cabinet. With the structure, a cone or a vibration surface of the speaker unit is directed in parallel with the baffle plate.

In case of a stationary type speaker system for installation within a vehicle compartment, the cabinet has relatively light weight. With the light weight structure, the cabinet and the baffle plate may be vibrated due to the low range audible sound emanation from the woofer, and further, resonance may occur at a specific frequency, to thereby degrade a frequency response characteristic. As a result, a desirable reproduced sound may not be provided.

SUMMARY OF THE INVENTION

It is therefore, an object of the present invention to eliminate the above described drawbacks, and to provide an improved speaker system capable of restraining unwanted vibrations of a cabinet and a baffle plate at low range sound emanation, to thereby generate desirable reproduced sound.

These and other objects of this invention will be attained by providing a speaker system, comprising: an elongated cabinet providing a longitudinal direction and installable in horizontal direction, the cabinet having a front open end: an elongated baffle plate fixedly secured to the front open end, the cabinet and the baffle plate having inner surfaces defining a cabinet chamber: a woofer speaker disposed in the cabinet chamber and having a vibration surface and a speaker frame; and, woofer support means provided in the cabinet chamber for interposedly supporting the woofer speaker between the cabinet and the baffle plate, the vibration surface of the woofer speaker extending in a direction perpendicular to the longitudinal direction of the cabinet.

In one embodiment of the invention, the woofer support means includes a first partitioning wall extending from an inner surface of the cabinet, and a second partitioning wall extending from an inner surface of the baffle plate. These partitioning walls extend in a direction perpendicular to the longitudinal direction of the cabinet, and have inner free end portions coupled to the woofer speaker. Therefore, the woofer speaker can be interposedly supported by and between the cabinet and the baffle plate.

DETAILED DESCRIPTION OF THE DRAWINGS

In the drawings,

FIG. 1 is a top plan view showing a speaker system according to the present invention;

FIG. 2 is a front elevational view showing the speaker system according to this invention;

DETAILED DESCRIPTION OF THE PREFERRED EMBODIMENT

Figure 3:
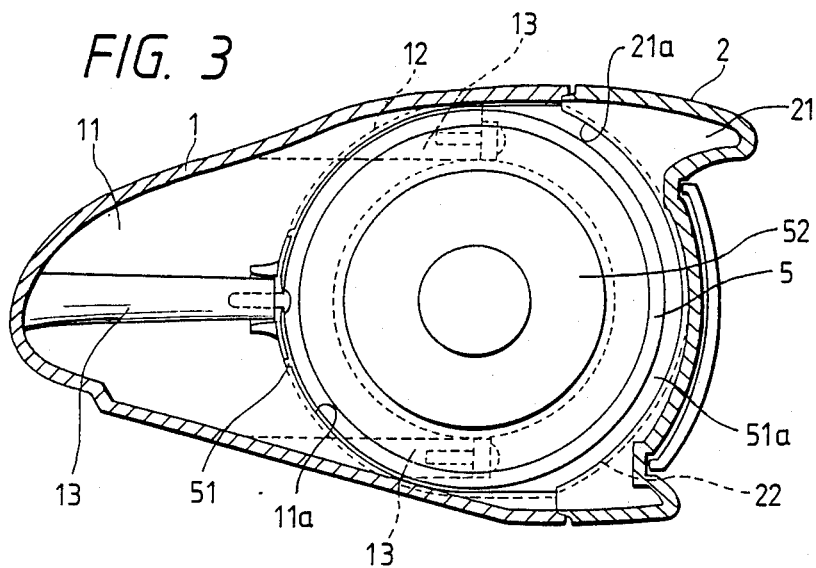
FIG. 3 is a cross-sectional view taken along the line III—III in FIGS. 1 and 2; and, FIG. 4 is a cross-sectional view taken along the line IV—IV in FIG. 1.

One embodiment according to this invention will be described with reference to drawings. The embodiment concerns a speaker system mounted on a vehicle compartment, particularly, mounted on an upper bag pannel provided rearwardly relative to a rear seat of the vehicle compartment.

The speaker system includes a cabinet and a baffle plate 2. The cabinet 1 has a generally elongated boatlike shape extending in a horizontal direction and is formed of a resin material. The cabinet 1 defines a front open end. The baffle plate 2 has an elongated shape and has an outer peripheral edge surface fitted with the front open end of the cabinet 1. By securing the baffle plate 2 to the cabinet 1, a cabinet chamber or a casing is defined therebetween. The baffle plate 2 is also formed of a resin material. When mounting the speaker system on an upper bag pannel in the vehicle compartment, the cabinet 1 extends in transverse direction of the vehicle compartment, and the baffle plate 2 confronts the passanger's back, that is, the baffle plate 2 is positioned at front side of the speaker system. The cabinet and the baffle plate 2 are fixed together by screws.

As shown in FIG. 1, an indication window 10 is formed at an upper wall of the cabinet 1, and as best shown in FIG. 2 each pair of a mid range speaker 3 and a high range speaker 4 are provided at each end portions of the baffle plate 2 for providing right and left channels. Cones or vibration surfaces of the speakers 3 and 4 direct frontwardly.

Partitioning plates 11 and 21 are provided to divide the casing into two chambers (right and left chambers). The partitioning plates 11 and 21 are positioned at generally longitudinal center portion of the cabinet 1, and are oriented in transverse direction of the cabinet 1. More specifically, the first partitioning plate 11 is fixedly attached or integrally provided to an inner surface of the cabinet 1, and has a free arcuate end face 11a, whereas the second partitioning plate 21 is fixedly attached or integrally provided to an inner surface of the baffle plate 2, and has a free arcuate end face 21a. The plates 11 and 21 are in alignment with each other. The arcuate end face 11a of the plate 11 is formed with a groove 12, and the arcuate end face 21a of the plate 21 is formed with a groove 22.

Figure 4:
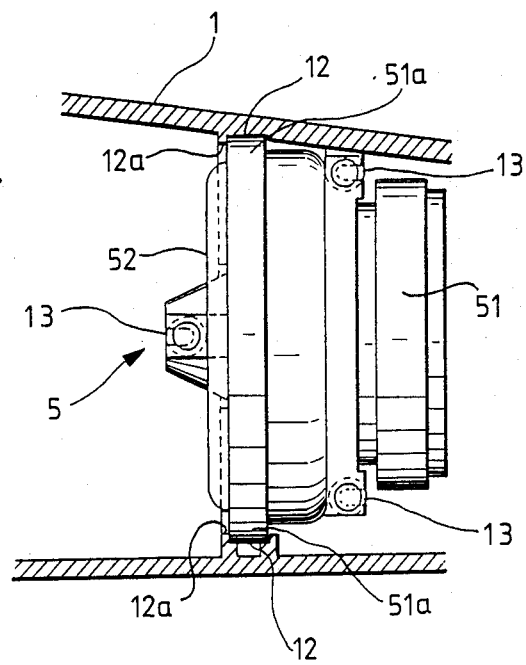

A single woofer speaker 5 is disposed at the central portion of the casing. As best shown in FIG. 4, the woofer speaker 5 includes a vibration surface or cone 52 and a rigid speaker frame 51 provided with an outer peripheral edge portion or flanged portion 51a engageable with the grooves 12 and 22. Therefore, the woofer speaker 5 is fixedly supported by the partitioning walls 11 and 21 by the fitting engagement between the flange 51a and the grooves 12 and 22. Further, the speaker frame 51 is also supported to the cabinet wall 1 by at least one woofer seat member 13 as shown in FIGS. 3 and 4. The woofer seat members 13 extend from the inner surface of the cabinet in parallel with the partitioning plate 12. Each free end of the woofer seat members 13 are connected to the speaker frame 51 through fixing members such as screws.

With the structure, the cone portion 52 of the woofer speaker 5 extends in a direction perpendicular to the longitudinal direction of the cabinet 1 and the baffle plate 2, and the woofer speaker 5 is fixedly supported by the cabinet 1 and the baffle plate 2 at generally longitudinal center portion thereof.

The baffle plate 2 is provided with a duct member 6 defining a front opening 6a which is open frontwardly. A frontal wave from the woofer speaker 5 is outputted through the duct member 6.

According to the above-described construction, the cone or the vibration surface 52 of the woofer speaker 5 extends in the direction perpendicular to the longitudinal direction of the cabinet 1. As a result, sufficient length or distance is provided between the rear portion of the woofer speaker 5 and a wall of the cabinet confronting the rear of the woofer speaker 5. Therefore, disadvantaegeous vibation of the cabinet 1 due to the back pressure generated by the woofer speaker 5 can be eliminated or restrained within a minimum level. Further, in the present invention, the flange portion 51a of the woofer speaker 5 is fitted with both the cabinet 1 and the baffle plate 2 at generally longitudinal center portion thereof, and therefore, high rigidity of the baffle plate and the cabinet is obtainable. That is, the casing provided by the cabinet, 1 and the baffle plate 2 can undergo reinforcement by the the woofer speaker frame 51 by way of the partitioning plates 11 and 21. Accordingly, unwanted vibration of the cabinet 1 and the baffle plate 2 can be restrained at low or mid range audible sound generation, to thereby restrain resonance. Thus, in the present invention, desirable reproduced sound can be provided.

In the foregoing embodiment, the woofer speaker 5 is provided at the generally longitudinal center of the cabinet 1. However, the woofer speaker position can be modified to a position ranging from one third length of the cabinet to the half length thereof with respect to the longitudinal direction of the cabinet.

While the invention has been described in detail and with reference to specific embodiment thereof, it would be apparent for those skilled in the art that various changes and modifications can be made therein without departing from the spirit and scope of the invention.

What is claimed is:

1. A speaker system comprising:
   an elongated cabinet having an elongate shape defining a longitudinal direction, the cabinet having an open front end;
   an elongated baffle plate fixedly secured to the front open end, wherein the cabinet and the baffle plate having inner surfaces defining a cabinet chamber;
   a woofer speaker disposed in the cabinet chamber and having a vibration surface that produces sound waves from a front and back of said vibration surface, and a speaker frame; and
   woofer support means provided in the cabinet chamber for interposedly supporting the woofer speaker between the cabinet and the baffle plate, the vibration surface of the woofer speaker extending in a direction perpendicular to the longitudinal direction of the cabinet, and having one of said front or back of said vibration surface arranged to emanate said sound waves into a sealed portion of said cabinet chamber acting as an infinite baffle, wherein said woofer support means positions said woofer speaker within a middle one-third of a longitudinal length of said cabinet so as to minimize transmittance, by back pressure, of vibrations to a wall of said cabinet within said sealed portion confronting said one of said front or back of said vibration surface.

2. The speaker system as defined in claim 1, wherein the woofer support means comprises;
   a first partitioning wall extending from the inner surface of the cabinet, the first partitioning wall having a free end face formed with a first groove, and;
   a second partitioning wall extending from the inner surface of the baffle plate, and provided in alignment with the first partitioning wall, the second partitioning wall having a free end face formed with a second groove, the speaker frame having a flange portion engageable with the first and second grooves.

3. The speaker system as defined in claim 2, wherein said woofer support means further comprises at least one woofer seat member extending from the inner surface of the cabinet in a direction parallel with the first partitioning wall, said woofer seat member being connectable to the speaker frame.

4. The speaker system as defined in claim 1, futher comprising: mid range speakers secured to the baffle plate and high range speakers secured to the buffle plate.

5. A speaker system comprising:
   an elongated cabinet having an elongate shape defining a longitudinal direction, the cabinet having an open front end;
   an elongated baffle plate fixedly secured to the front open end, wherein the cabinet and the baffle plate having inner surfaces defining a cabinet chamber, a woofer speaker disposed in the cabinet chamber and having a vibration surface that produces sound waves from a front and back of said vibration surface and a speaker frame, and said baffle plate has vent means disposed at a central portion thereof for allowing said sound waves emanating from one of said front or back of said woofer speaker to be transmitted from inside said cabinet chamber to an external environment; and
   woofer support means provided in the cabinet chamber for interposedly supporting the woofer speaker between the cabinet and the baffle plate, the vibration surface of the woofer speaker extending in a direction perpendicular to the longitudinal direction of the cabinet, and having one of said front or back of said vibration surface arranged to emanate said sound waves into a portion of said cabinet chamber in communication with said vent means, and one of said front or back of said vibration surface arranged to emanate said sound waves into a sealed portion of said cabinet chamber acting as an infinite baffle, wherein said woofer support means positions said woofer speaker within a middle one-third of a longitudinal length of said cabinet so as to minimize transmittance, by back pressure, of vibrations to a wall of said cabinet within said sealed portion confronting said one of said front or back of said vibration surface.

* * * * *